United States Patent [19]

Fukuzawa

[11] Patent Number: 5,899,576
[45] Date of Patent: May 4, 1999

[54] APPARATUS FOR RECORDING AND REPRODUCING DATA ON AND FROM A STORAGE DEVICE HAVING A PLURALITY OF KINDS OF STORAGE MEDIA INTEGRALLY PROVIDED THEREIN

[75] Inventor: Keiichi Fukuzawa, Yamato, Japan

[73] Assignee: Canon Kabushiki Kaisha, Tokyo, Japan

[21] Appl. No.: 08/731,599

[22] Filed: Oct. 16, 1996

[30] Foreign Application Priority Data

Oct. 23, 1995 [JP] Japan ................................ 7-274145

[51] Int. Cl.⁶ .................................................. H04N 5/93
[52] U.S. Cl. ................... 386/52; 386/64; 386/95
[58] Field of Search ................... 386/52, 55, 64, 386/77, 95; 360/13, 15, 132, 92–93; 369/83–84; H04N 5/33

[56] References Cited

U.S. PATENT DOCUMENTS 4,338,644  7/1982  Staar ............................. 360/132
4,641,203  2/1987  Miller ............................ 358/335
4,723,181  2/1988  Hickok ......................... 360/72.2
4,839,875  6/1989  Kuriyama et al. ............. 369/14
4,841,386  6/1989  Schiering ...................... 360/69
5,233,477  8/1993  Scheffler ....................... 360/15
5,636,078  6/1997  Tsai ............................. 360/72.1

FOREIGN PATENT DOCUMENTS 0 545 727 A2  6/1993  European Pat. Off. ........ G11B 27/32

Primary Examiner—Wendy Garber
Assistant Examiner—Vincent F. Boccio
Attorney, Agent, or Firm—Robin, Blecker & Daley

[57] ABSTRACT

When duplicating or causing data recorded in one cassette of the kind containing a magnetic tape and a memory therein to be copied or dubbed in another cassette, a reproducing apparatus outputs both data recorded on the magnetic tape and data stored in the memory, and a recording apparatus records the data reproduced from the magnetic tape and the data read from the memory, which are outputted from the recording apparatus, on or in a magnetic tape and a memory contained in the other cassette, respectively.

10 Claims, 5 Drawing Sheets

FIG. 5

| LOWER \ UPPER | 0h | 1h | 2h | ----- | Fh |
|---|---|---|---|---|---|
| 0h | | | | | |
| 1h | | PROGRAM START | | | |
| 2h | | PROGRAM END | | | |
| ⋮ | | | | | |
| Fh | | | | | |

APPARATUS FOR RECORDING AND REPRODUCING DATA ON AND FROM A STORAGE DEVICE HAVING A PLURALITY OF KINDS OF STORAGE MEDIA INTEGRALLY PROVIDED THEREIN

BACKGROUND OF THE INVENTION

1. Field of the Invention

This invention relates to a recording and reproducing apparatus, and more particularly to a method of copying a storage device having a plurality of different kinds of storage media integrally provided therein.

2. Description of Related Art

Hitherto, there have been known digital VTRs (video tape recorders) which record and reproduce video and audio data in the form of digital data on and from magnetic tapes. Some of such digital VTRs have been developed to record and reproduce, together with the video and audio data, auxiliary data related to the video and audio data (the auxiliary data being hereinafter referred to as system data). It has been proposed that the contents of such system data include information about the content of recorded data, such as identification information of a record, a date of recording, a condition of recording and a mark indicative of the start/end of recording, associated with the recent various kinds of multimedia, and also information provided for comfortable operability, such as numbers assigned to recording tracks and marks arranged to facilitate a search for leader parts of records.

The system data mentioned above is generally recorded, along with the recording data, in tracks formed on a magnetic tape. Recently, it has been proposed that a tape cassette containing the magnetic tape therein is equipped with an auxiliary memory such as a semiconductor memory, which is of a high accessibility, and a part of the system data is recorded in the auxiliary memory so as to be read out for use as necessary.

Meanwhile, in the field of analog VTRs of the kind using VHS or 8 mm tapes, it is practiced to carry out so-called dubbing whereby data recorded in one cassette is copied and recorded in another cassette.

A dubbing function similar to the dubbing of the analog VTRs is deemed to be necessary also for a digital VTR of the kind described above. When video data or audio data recorded in one cassette is to be dubbed in another cassette, it is only required that data reproduced from a magnetic tape contained in one cassette is recorded on a magnetic tape contained in another cassette.

However, in a case where the above-mentioned system data has been recorded in the auxiliary memory as well as on the magnetic tape, so far as video data or audio data recorded in the magnetic tape is merely dubbed, the system data intentionally recorded also in the auxiliary memory is not reflected in an auxiliary memory provided in a cassette in which the video data or audio has been dubbed. In short, in that instance, as for the system data, only a part of the system data as recorded on the magnetic tape would be dubbed, so that the auxiliary memory cannot be utilized at all.

Therefore, when the operator of the VTR wishes to quickly make reference to the system data, it would be impossible to meet the wish of the operator.

BRIEF SUMMARY OF THE INVENTION

This invention is directed to the solution of the problem mentioned in the foregoing.

It is, therefore, an object of this invention to provide a recording and/or reproducing apparatus arranged to permit a dubbing action also on system data stored in an auxiliary memory as well as data recorded on a magnetic tape.

It is another object of this invention to provide an apparatus arranged to be capable of adequately dubbing effective system data in an auxiliary memory without inconsistency.

It is a further object of this invention to provide an apparatus arranged to reflect accurate system data in an auxiliary memory.

To attain these objects, in accordance with an aspect of this invention, there is provided a recording apparatus comprising input means for receiving data reproduced respectively from a first storage medium and a second storage medium of respective different kinds which are integrally provided in a first storage device, first forming means for forming first data on the basis of the data reproduced from the first storage medium, second forming means for forming second data on the basis of the data reproduced from the second storage medium, and recording means for recording data in a second storage device which is integrally provided with a third storage medium and a fourth storage medium of respective different kinds, the recording means recording the first data in the third storage medium and recording the second data in the fourth storage medium.

These and other objects and features of this invention will become apparent from the following detailed description of embodiments thereof taken in conjunction with the accompanying drawings.

BRIEF DESCRIPTION OF SEVERAL VIEWS OF THE DRAWING

FIG. 5 is a diagram for explaining the system data to be handled by the system shown in FIG. 1.

DETAILED DESCRIPTION OF THE INVENTION

Preferred embodiments of this invention will be described in detail with reference to the drawings.

Figure 1:
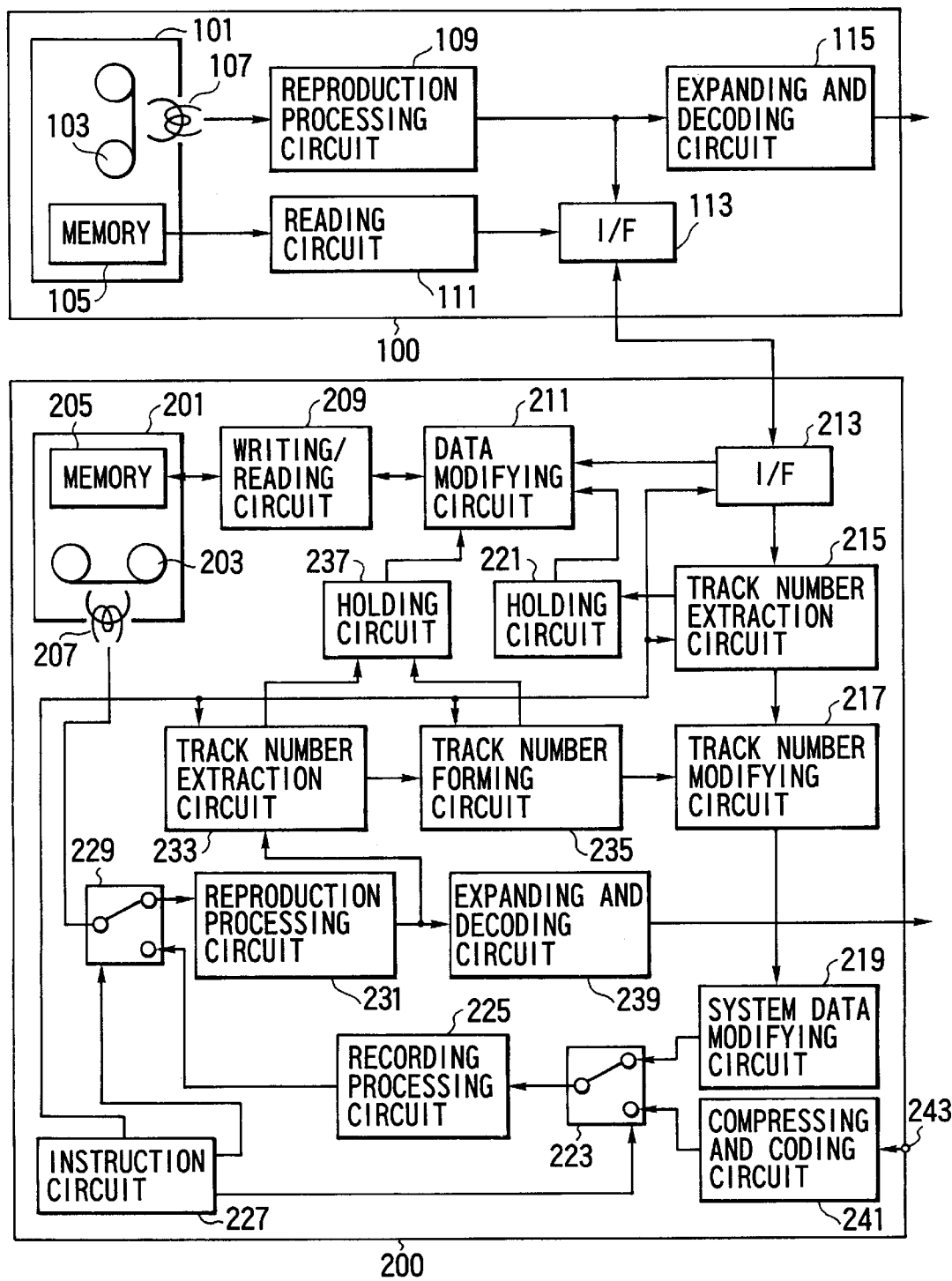
FIG. 1 is a block diagram showing the arrangement of a system of digital VTRs according to an embodiment of this invention.

FIG. 1 is a block diagram showing the arrangement of a system which is arranged to perform dubbing by using two digital VTRs, according to an embodiment of this invention. The illustration of FIG. 1 includes only such parts of the VTRs that are required for dubbing both on the side of reproduction and on the side of recording. In the system according to this invention, however, these VTRs of course may be of the same structural arrangement.

Referring to FIG. 1, a VTR 100, which is arranged on the side of reproduction, includes a cassette 101 which contains therein a magnetic tape 103 on which video data, audio data, system data, etc., are recorded as digital data and a semiconductor memory 105 in which system data, etc., are stored, a head 107 arranged to reproduce from the magnetic tape 103 the recorded data, a reproduction processing circuit 109 arranged to convert the data obtained by the head 107 into original digital data and to correct errors in the reproduced data, a reading circuit 111 arranged to read out the system data, etc., stored in the memory 105, an interface circuit (hereinafter referred to as I/F) 113 arranged to output the reproduced data and the read system data to some other apparatus, and an expanding and decoding circuit 115 arranged to decode the video data supplied from the reproduction processing circuit 109 and to expand the amount of information of that data.

Another VTR 200, which is arranged on the side recording, includes a cassette 201 which has the same structure as the cassette 101 and which contains therein a magnetic tape 203 and a semiconductor memory 205, a head 207 arranged to perform a recording action on the magnetic tape 203, a writing/reading circuit 209 arranged to read and write system data out of and into the semiconductor memory 205, a data modifying circuit 211 arranged to modify the system data in a manner as will be described later, an interface circuit (I/F) 213 arranged to receive data supplied from the VTR 100 arranged on the side of reproduction and to output to the I/F 113 a command relative to the kind of data which is to be supplied by the I/F 113 as will be described later, a track number extraction circuit 215 arranged to extract track number data from the data received by the I/F 213, a track number modifying circuit 217 arranged to modify the track number data of the received data, a system data modifying circuit 219 arranged to modify system data of the received data, a holding circuit 221 arranged to hold the track number data extracted by the track number extraction circuit 215, a switch 223 arranged to selectively supply to a recording processing circuit 225 the data supplied through the system data modifying circuit 219 or video and audio data supplied from outside, the recording processing circuit 225 arranged to convert the data supplied through the switch 223 into data of a form suited for recording by subjecting the data to an error correction coding with some parity data for error correction added as will be described later and by subjecting the data to a digital modulation process, an instruction circuit 227 including an operation part operable for an operator to give an instruction for recording, reproduction, etc., so as to give instructions to each applicable circuit of the VTR 200, a switch 229 arranged to select recording data or reproducing data in accordance with an instruction from the instruction circuit 227, a reproduction processing circuit 231 having the same function as the reproduction processing circuit 109 and arranged to convert data reproduced from the magnetic tape 203 into original digital data and to correct errors included in the reproduced data, a track number extraction circuit 233 arranged to extract track number data from the data outputted from the reproduction processing circuit 231, a track number forming circuit 235 arranged to form track number data on the basis of the track number data extracted by the track number extraction circuit 233, a holding circuit 237 arranged to hold the track number data outputted from the track number extraction circuit 233 and the track number data outputted from the track number forming circuit 235, an expanding and decoding circuit 239 having the same function as the expanding and decoding circuit 115, and a compressing and coding circuit 241 arranged to compress the amount of information of data inputted from an input terminal 243 and to code the data.

In dubbing the data recorded in the cassette 101 into the cassette 201, the system which is arranged as described above performs the dubbing operation as follows.

Operation of the VTR 100, which is arranged on the side of reproduction, will be first described.

Figure 2:
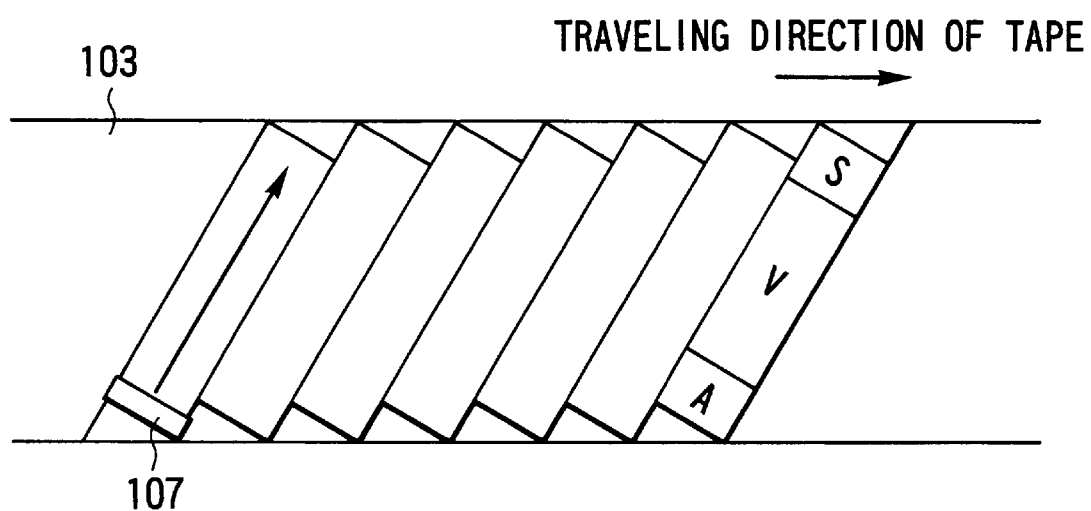
FIG. 2 shows a format of recording on a magnetic tape by the digital VTR arranged as shown in FIG. 1.

Video data and audio data recorded in a number of tracks on the magnetic tape 103, as shown in FIG. 2, are read by the head 107 and are then supplied to the reproduction processing circuit 109. Incidentally, as shown in FIG. 2, each track has three areas in which audio data, video data and system data are respectively recorded in the order of tracing by the head 107. At the reproduction processing circuit 109, the data obtained by the head 107 are converted into original digital data with data errors corrected by using parity data added at the time of recording. Any data that cannot be corrected is subjected to a recovering process before being outputted. The expanding and decoding circuit 115 decodes the reproduced data and expands the amount of information of the reproduced data before outputting it to the outside of the VTR 100. In this embodiment, the compressing and coding processes have been performed by using a known DCT variable-length coding method.

Further, the system data stored in the memory 105 is read out by the reading circuit 111 and is then supplied to the I/F 113. At the I/F 113, the reproduced data in a compressed and coded state supplied from the reproduction processing circuit 109 and the system data supplied from the reading circuit 111 are processed into a format suited for transmission and are then supplied to the I/F 213 of the VTR 200, which is arranged on the side of recording. Incidentally, the data from the magnetic tape 103 and the system data from the memory 105 are outputted asynchronously with each other in a manner as will be described later.

Operation of the VTR 200, which is arranged on the side of recording, will be next described.

Prior to a recording operation for dubbing, the operator of the system operates the operation part of the instruction circuit 227 to cause the magnetic tape 203 to be subjected to reproduction up to a portion of the magnetic tape 203 where the dubbing recording is desired to start. Then, an instruction for a pause is given by the operator when the recording start portion has been reached.

During such reproduction, data obtained by the head 207 is supplied through the switch 229 to the reproduction processing circuit 231 to be subjected to an error correcting process. The track number extracting circuit 233 extracts track number data from the data supplied from the reproduction processing circuit 231 at the point of time when the instruction for a pause is given from the instruction circuit 227, i.e., at the recording start portion. Incidentally, in the case of this embodiment, data indicative of the individual track number is recorded in an area S of each track on the magnetic tape 203 as shown in FIG. 2. The track number indicated by the data is arranged to increase one by one from the number of one track to that of the next track, beginning with the fore end of the magnetic tape. The track number indicated by the track number data which is extracted by the track number extraction circuit 233 at the recording start portion is held by the holding circuit 237.

The track number data extracted at the recording start portion by the track number extraction circuit 233 is supplied also to the track number forming circuit 235. The track number forming circuit 235 then forms subsequent track number data from the extracted track number data. The subsequent track number data thus formed is supplied to the track number modifying circuit 217.

Now, the VTR 200, which is arranged on the side of recording, is completely prepared in this manner for the dubbing recording. The operator then operates an operation part (not shown) of the reproduction-side VTR 100 to give an instruction for reproducing the data recorded on the magnetic tape 103 and for reading the system data stored in the memory 105 and, at the same time, gives an instruction from the instruction circuit 227 for a start of dubbing recording. In response to the instruction for dubbing recording, the I/F 213 first requests the I/F 113 to output the reproduced data obtained from the magnetic tape 103.

In accordance with the request of the I/F 213, the I/F 113 outputs the data (hereinafter referred to as source data) from a terminal which is not shown. The source data is inputted to the I/F 213. The I/F 213 determines whether the source data supplied from the I/F 113 is the reproduced data from the magnetic tape 103 or the system data from the memory 105. The I/F 213 then supplies the reproduced data obtained from the magnetic tape 103 to the track number extraction circuit 215, and also supplies the system data obtained from the memory 105 to the data modifying circuit 211. The system data is then stored in a memory disposed within the data modifying circuit 211. The track number extraction circuit 215 extracts track number data from the source data supplied from the I/F 213, in accordance with an instruction given from the instruction circuit 227 for starting the dubbing recording. The extracted track number data is supplied to the holding circuit 221. Thus, the track number data extracted from the source data at this time indicates a track number of a dubbing recording start portion in the source data.

The source data having passed through the track number extraction circuit 215 is supplied to the track number modifying circuit 217. The track number modifying circuit 217 adds track number data supplied from the track number forming circuit 235 to the source data, in place of the track number data included in the source data, and then supplies the thus-added source data to the system data modifying circuit 219. The system data modifying circuit 219 modifies such a part of the system data included in the source data that must be modified for dubbing. The part of the system data to be modified is, for example, data indicating whether the recorded data has previously been subjected to any dubbing. The source data thus processed by the system data modifying circuit 219 is supplied via the switch 223 to the recording processing circuit 225. At the recording processing circuit 225, an encoding process for error correction is performed by adding parity data to the source data and a digital modulation process is performed to convert the source data into a form suited for recording. The data thus processed is supplied via the switch 229 to the head 207 and is then recorded on the magnetic tape 203 in accordance with the format shown in FIG. 2.

When the dubbing operation is to be ended, an instruction is given through the instruction circuit 227 to bring the recording action to a stop. In response to the instruction, a track number formed by the track number forming circuit 235 at the end point of the dubbing operation is held by the holding circuit 237. At the same time, a track number extracted by the track number extraction circuit 215 from the source data at the end point of the dubbing operation is also held by the holding circuit 221.

A modifying action on the contents of the system data to be dubbed in the memory 205 will be next described.

Prior to the dubbing recording, first, the writing/reading circuit 209 reads system data out of the memory 205, into which the dubbing recording is to be effected. The system data thus read out is written into a memory disposed within the data modifying circuit 211.

Figure 3:
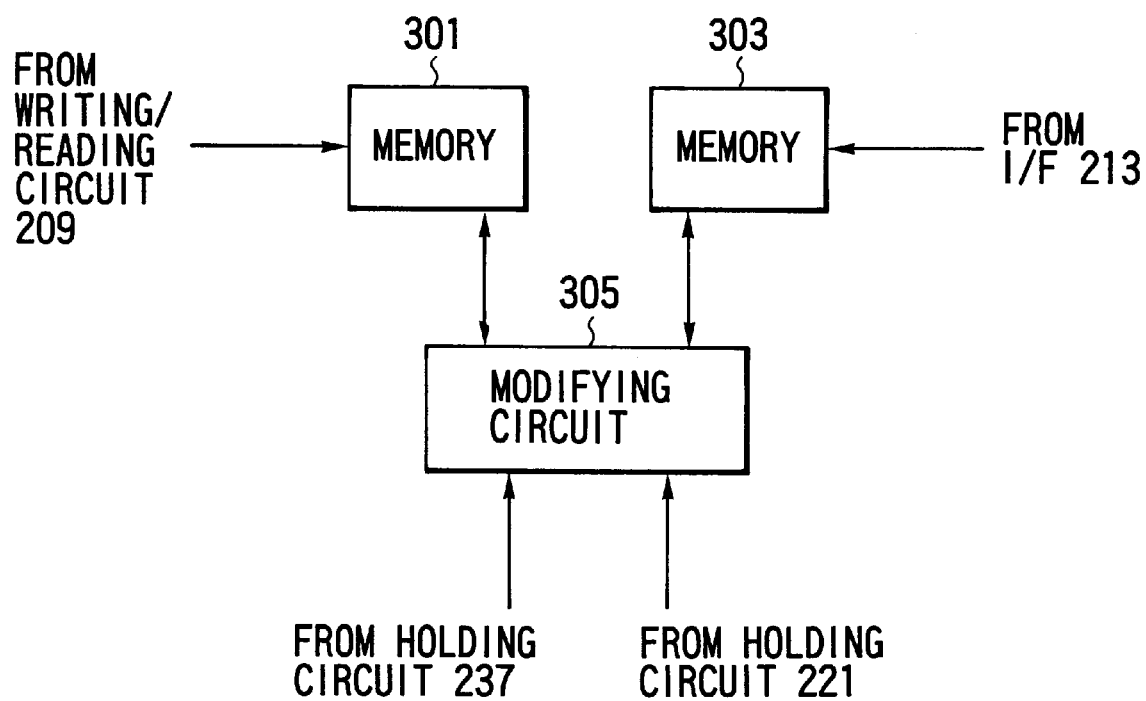
FIG. 3 is a block diagram showing the arrangement of a data modifying circuit included in the system shown in FIG. 1.

FIG. 3 shows in detail the arrangement of the data modifying circuit 211. Referring to FIG. 3, the data modifying circuit 211 includes a memory 301 arranged to store the system data read from the memory 205 by the writing/reading circuit 209 as will be described later, a memory 303 arranged to store the system data included in the source data supplied from the I/F 213, and a modifying circuit 305 arranged to reconstruct system data stored within the memory 301 in a manner as will be described later.

Here, data stored in the memories 105 and 205 and memory spaces thereof will be described.

Figure 4:
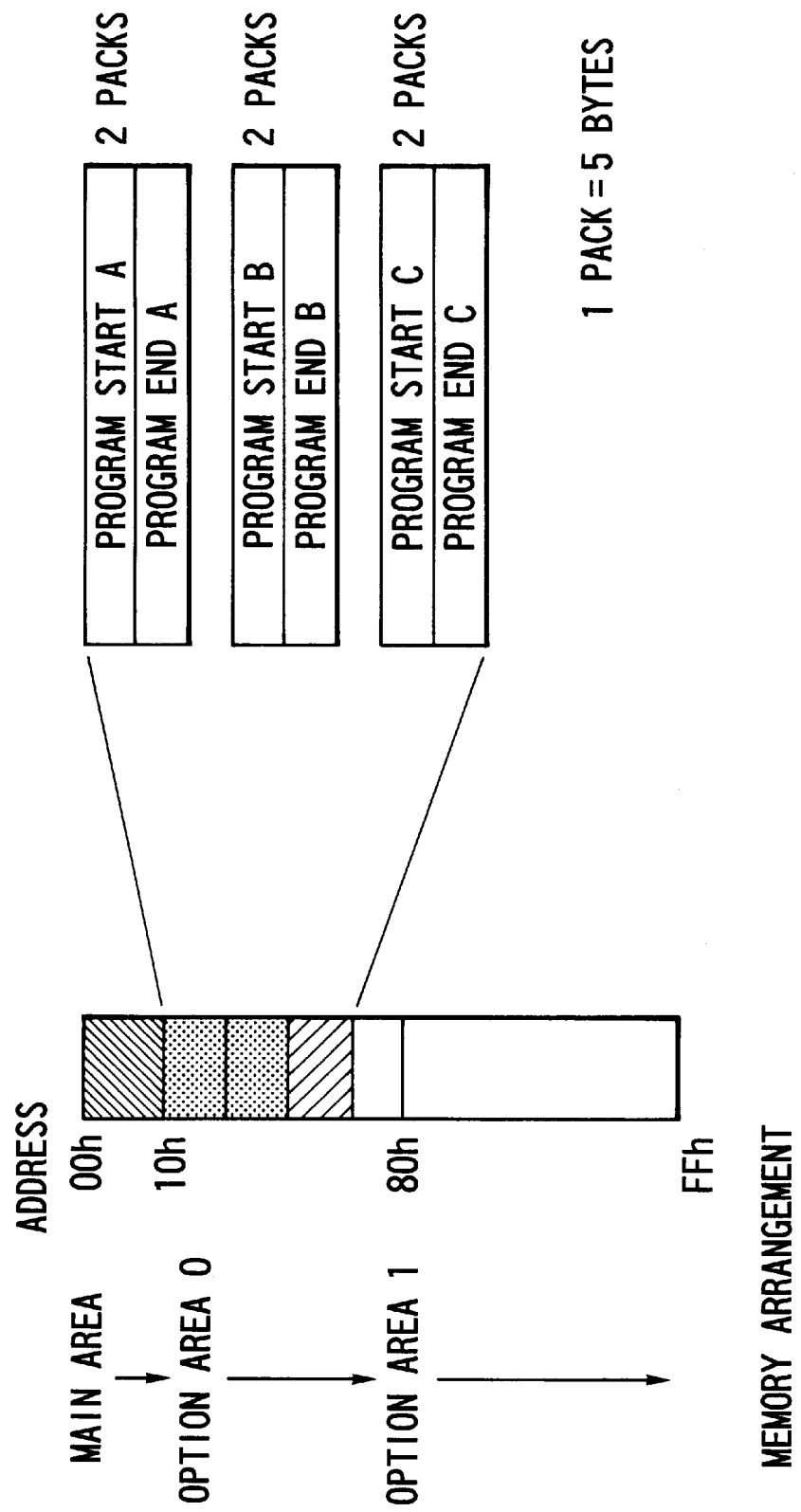
FIG. 4 shows the manner in which system data to be handled by the system shown in FIG. 1 is memorized.

FIG. 4 shows by way of example the memory spaces and the recorded data in the memory 105 or 205. Referring to FIG. 4, addresses "00h" to "10h" are provided for recording basic ID data of the cassette. Addresses "10h" to "7Fh" are provided as "option area 0" for recording data indicative of track numbers of the start and end positions of each program, as program start data and program end data, which data corresponds to program information on the magnetic tape included in the system data recorded in the area S shown in FIG. 2 and has the same contents as the system data recorded on the magnetic tape. Since the information on programs recorded on the magnetic tape 103 or 203 is thus recorded in the memory 105 or 205, the contents of data recorded on the magnetic tape 103 or 203 can be found by just reading the program information out of the memory 105 or 205 without transporting the magnetic tape.

FIG. 5 is a table showing headers of information units (hereinafter referred to as packs) used for packaging in the embodiment in recording data such as the above-stated program information in the memory 105 or 205. In the case of the embodiment, each pack consists of data of eight bits formed by combining a header of four upper bits and a header of four lower bits. For example, as shown in FIG. 5, a header is assigned to each combination of program start information and program end information. Other headers are assigned also to information of various kinds.

In the case of the embodiment, headers of the packs are arranged to be "1xh" for a program, "11h" for a program start and "12h" for a program end. The program start pack includes a track number where recording of the program begins. The program end pack includes a track number where the program recording ends.

In the embodiment, the respective system data which have been stored in the memories 105 and 205 are stored respectively in the memories 303 and 301 of the data modifying circuit 211 in a manner as shown in FIG. 4.

Next, a modifying operation for modifying system data will be described.

When an instruction is given from the instruction circuit 227 for ending the dubbing recording, the I/F 213 requests the I/F 113 to output the system data obtained from the memory 105. The I/F 213 then allows the memory 303 of the data modifying circuit 211 to store the system data received from the I/F 113. Subsequently, the track number data at the recording start portion and recording end portion of the source data, which have been held by the holding circuit 221, are inputted to the modifying circuit 305 disposed within the data modifying circuit 211. Then, in the system data included in the source data supplied from the I/F 213 and stored in the memory 303, all parts of the system data other than a data part related to the periods of these track numbers are erased from the memory 303.

Further, the track number data at the recording start portion and recording end portion of the magnetic tape 203, which have been held by the holding circuit 237, are also inputted to the modifying circuit 305. Then, in the system data read out of the memory 205 and stored in the memory 301, all parts of the system data related to the periods of these track numbers are erased from the memory 301.

Then, the modifying circuit 305 compares the track number data at the recording start portion and recording end portion of the magnetic tape 203 held by the holding circuit 237 with the track number data at the recording start portion and recording end portion of the source data held by the holding circuit 221 so as to find a discrepancy between these data. The result of this comparison is data indicating a difference between a track number subjected to the actual dubbing and a corresponding track number indicated by the source data. By using this data, the modifying circuit 305 modifies the track number data in the system data included in the source data supplied through the I/F 213. This modifying operation includes a modifying action on the track numbers included in the program start pack and program end pack shown in FIG. 4.

The system data related to the data dubbed from the cassette 101 to the cassette 203 is rewritten upon completion of the sequence of erasing and modifying processes performed on the system data. The modifying circuit 305 newly constructs the system data on the basis of the modified data on the memory 301. The new system data is supplied to the writing/reading circuit 209. The writing/reading circuit 209 causes the new system data to be stored in an applicable area of the memory 205.

According to the arrangement of this embodiment described above, in dubbing data recorded on a magnetic tape to another magnetic tape, system data stored in a memory is also dubbed. It is, therefore, possible to reflect the system data related to the dubbed data in a memory disposed in a cassette subjected to the dubbing.

Further, a dubbing operation can be adequately carried out without such a trouble that track numbers happen to become inconsecutive before and after the dubbing start portion or the dubbing end portion or that the system data written into the memory 205 after dubbing deviates from the data recorded on the magnetic tape.

The arrangement for removing any part of the system data that is rendered inapposite by a dubbing operation enables the system data to be effectively stored without leaving any unnecessary data in the memory arranged on the recording side.

The arrangement for selecting only such a data part that is apposite to the dubbed data among the system data included in the source data and recording the selected data part in the memory 205 enables the memory to be effectively used without loading the memory with any inapposite data.

The above-described embodiment is arranged on the assumption that there are some tracks preceding a track where a dubbing recording operation is to be allowed to begin on the magnetic tape 203. The embodiment is thus arranged to extract track number data at the recording start portion for dubbing by reproducing the preceding tracks prior to dubbing.

However, if the magnetic tape 203 has no previous record and there is no preceding track before the dubbing starting track on the magnetic tape 203, it would be impossible to reproduce any track number data. To solve this problem, in a second embodiment which is a system arranged similarly to the first embodiment described in the foregoing, the track number extraction circuit 233 is arranged to have the function of predicting a track number. In other words, the second embodiment is arranged to rewind the magnetic tape 203 back to a point where a track number has been recorded last on the magnetic tape before dubbing and to predict the track number of the dubbing recording start portion on the basis of the track number last recorded.

More specifically, the track number of a dubbing recording start portion is computed from the rotational frequency of a reel on which the magnetic tape 203 is wound and the traveling speed of the magnetic tape 203. The track number extraction circuit 233 then extracts data of a predicted track number obtained when an instruction for a pause is given from the instruction circuit 227 and sends the extracted data to the holding circuit 237 and the track number forming circuit 235. In this instance, the track number extraction circuit 233 forms together with the track number data a flag indicating that the track number data shows a predicted value.

Further, the first embodiment is arranged to erase data parts corresponding to a period between the track number of a dubbing start portion and that of a dubbing end portion from the system data read out from the memory 205 prior to dubbing. In the second embodiment, on the other hand, the erasing action is not necessary because no data is recorded for this period to begin with.

Therefore, in the case of the second embodiment, the data modifying circuit 211 is arranged such that a data part for the track number of a dubbing start portion and a data part for a dubbing end portion of the system data included in the source data are replaced respectively with predicted track number data supplied from the track number extraction circuit 233 and the track number forming circuit 235. The track number data thus modified is again written into the memory 205 together with a flag which indicates that the track number data is a predicted data.

Even in a case where no record of track number data is found at the dubbing start portion, the arrangement described above enables track number data to be recorded after dubbing. Further, in this instance, no inconsistency of track number data takes place within the system data.

While each of the embodiments has been described as being arranged to perform a copying (duplicating) action on the cassettes of the kind having a magnetic tape and a memory, the applicability of this invention is not limited to the cassettes of this kind. This invention applies also to a case where a storage device having memories of a plurality of kinds integrally provided therein is to be duplicated.

I claim:

1. A recording apparatus comprising:

a) input means for receiving first digital data and first control data reproduced from a first storage device which is integrally provided with a first tape-shaped recording medium and a first memory, a multiplicity of helical tracks being formed on and the first digital data which includes first video data and first track number data being recorded on said first tape-shaped recording medium, the first control data being related to the first video data and being stored in said first memory;

b) recording means for recording data in a second storage device which is integrally provided with a second tape-shaped recording medium and a second memory, a multiplicity of helical tracks being formed on said second tape-shaped recording medium and second digital data which includes second video data and second track number data being recorded thereon, the second control data being related to the second video data and being stored in said second memory;

c) track number detecting means for detecting a track number of a recording start position at which a recording operation begins on said second tape-shaped recording medium, said track number detecting means including predicting means for predicting the track number of the recording start position when there exists no record of the second track number data preceding the recording start position on said second tape-shaped recording medium;

d) first modifying means for modifying the first track number data included in the first digital data received by said input means on the basis of the track number of the recording start position detected by said track number detecting means; and e) second modifying means for modifying the second control data stored in said second memory on the basis of the track number of the recording start position detected by said track number detecting means and the first control data received by said input means, said recording means recording on said second tape-shaped recording medium the first digital data including the first track number data modified by said first modifying means and recording in said second memory the second control data modified by said second modifying means.

2. An apparatus according to claim 1, further comprising reproducing means for reproducing the second digital data and the second control data from said second storage device.

3. An apparatus according to claim 2, wherein said track number detecting means includes extracting means for extracting the second track number data out of the second digital data reproduced by said reproducing means.

4. An apparatus according to claim 3, wherein said predicting means predicts the track number of the recording start position by using the second track number data extracted by said extracting means.

5. An apparatus according to claim 1, wherein the first video data is in a coded state and said input means receives the first video data in a coded state.

6. An apparatus according to claim 1, wherein said input means receives in a multiplexed state the first digital data and the first control data.

7. An apparatus according to claim 1, further comprising coding means for coding video data, wherein said recording means selectively records on said second tape-shaped recording medium the video data coded by said coding means or the first digital data including the first track number data modified by said first modifying means.

8. An apparatus according to claim 1, wherein said predicting means predicts the track number of the recording start position on the basis of the rotational frequency of a reel on which said second tape-shaped recording medium is wound and the transporting speed of said second tape-shaped recording medium.

9. An apparatus according to claim 1, wherein the track number indicated by each data of the first and second track number data is arranged to increase one by one from the number of one track to that of the next track.

10. A recording and reproducing system comprising:

A) a reproducing apparatus comprising:

a) reproducing means for reproducing first digital data and first control data from a first cassette which is integrally provided with a first tape-shaped recording medium and a first memory, a multiplicity of helical tracks being formed on said first tape-shaped recording medium and the first digital data which includes first video data and first track number data being recorded thereon, the first control data being related to the first video data and being stored in said first memory; and b) output means for outputting to a recording apparatus the first digital data and the first control data reproduced by said reproducing means; and B) a recording apparatus comprising:

a) input means for receiving the first digital data and the first control data outputted from said output means; and b) recording means for recording data in a second cassette which is integrally provided with a second tape-shaped recording medium and a second memory, a multiplicity of helical tracks being formed on said second tape-shaped recording medium and second digital data which includes second video data and second track number data being recorded thereon, second control data being related to the second video data and being stored in said second memory;

c) track number detecting means for detecting a track number of a recording start position at which a recording operation begins on said second tape-shaped recording medium, said track number detecting means including predicting means for predicting the track number of the recording start position when there exists no record of the second track number data preceding the recording start position on said second tape-shaped recording medium;

d) first modifying means for modifying the first track number data included in the first digital data received by said input means on the basis of the track number of the recording start position detected by said track number detecting means; and e) second modifying means for modifying the second control data stored in said second memory on the basis of the track number of the recording start position detected by said track number detecting means and the first control data received by said input means, said recording means recording on said second tape-shaped recording medium the first digital data including the first track number data modified by said first modifying means and recording in said second memory the second control data modified by said second modifying means.

* * * * *

UNITED STATES PATENT AND TRADEMARK OFFICE
CERTIFICATE OF CORRECTION

PATENT NO. : 5,899,576

DATED : May 4, 1999

INVENTOR(S) : Keiichi Fukuzawa

It is certified that error appears in the above-identified patent and that said Letters Patent is hereby corrected as shown below:

Column 2, line 4, after "as"(second occurrence) insert --on--.

Column 7, line 35, delete "such a trouble that".

Column 7, lines 35 and 36, delete "happen to become inconsecutive" and insert -- becoming nonconsecutive--.

Column 8, line 31, delete "a".

Signed and Sealed this

Twenty-eighth Day of September, 1999

Attest:

Q. TODD DICKINSON

Attesting Officer

Acting Commissioner of Patents and Trademarks